United States Patent
Huang et al.

(10) Patent No.: US 8,662,866 B2
(45) Date of Patent: Mar. 4, 2014

(54) FAN WITH FLEXIBLE DRIVE SHAFT

(75) Inventors: Su Shiong Huang, Bellevue, WA (US); Shengbo Zhu, San Jose, CA (US)

(73) Assignee: Silicon Valley Micro E Corp., San Jose, CA (US)

( * ) Notice: Subject to any disclaimer, the term of this patent is extended or adjusted under 35 U.S.C. 154(b) by 213 days.

(21) Appl. No.: 13/134,726

(22) Filed: Jun. 15, 2011

(65) Prior Publication Data

US 2012/0321492 A1  Dec. 20, 2012

(51) Int. Cl.
*F04D 29/05* (2006.01)
*F16C 1/02* (2006.01)

(52) U.S. Cl.
USPC ............... 417/363; 417/410.1; 417/423.12; 464/58

(58) Field of Classification Search
USPC .......... 417/362, 363, 410.1, 423.12; 416/100, 416/101; 464/52, 57, 58, 59, 60
See application file for complete search history.

(56) References Cited

U.S. PATENT DOCUMENTS

| | | | |
|---|---|---|---|
| 769,676 A * | 9/1904 | Bachtel | 416/100 |
| 780,740 A * | 1/1905 | Bachtel | 416/100 |
| 1,636,038 A * | 7/1927 | Bolozky et al. | 474/118 |
| 2,788,198 A * | 4/1957 | Anderson | 261/29 |
| 3,785,752 A * | 1/1974 | Crespo | 417/319 |
| 4,040,272 A * | 8/1977 | Boyd | 123/41.49 |
| 4,098,266 A * | 7/1978 | Muchisky et al. | 601/71 |
| 4,373,482 A * | 2/1983 | Goscenski, Jr. | 123/198 R |
| 4,441,462 A * | 4/1984 | Budinski | 123/41.11 |
| 6,354,949 B1 * | 3/2002 | Baris et al. | 464/7 |
| 7,367,605 B2 * | 5/2008 | Tores | 296/65.15 |
| 7,382,104 B2 * | 6/2008 | Jacobson et al. | 318/276 |
| 8,235,686 B2 * | 8/2012 | Wark | 417/410.1 |
| 8,266,762 B2 * | 9/2012 | Hsu | 15/327.5 |

FOREIGN PATENT DOCUMENTS

JP   03181732 A * 8/1991 ............ F24F 7/06

OTHER PUBLICATIONS

English Abstract of JP03181732A published Aug. 17, 1991.*

* cited by examiner

*Primary Examiner* — Devon Kramer
*Assistant Examiner* — Nathan Zollinger

(57) ABSTRACT

An electric motor driven fan device has a base member with walls forming an enclosure, an electrically powered motor located within the enclosure and having an output shaft coupled via a bearing mounted in an upper wall of the base member to one end of a flexible drive shaft rotatably enclosed in a bendable sheath secured to the base member. The other end of the flexible drive shaft is coupled via a second bearing to a driven shaft secured to a multi-bladed fan. The other end of the bendable sheath is secured to the outer race of the second bearing. The predominant mass of the device is at the bottom, which reduces the footprint of the lower portion. The bendable sheath enables the attitude of the fan to be manually adjusted.

6 Claims, 3 Drawing Sheets

FAN WITH FLEXIBLE DRIVE SHAFT

BACKGROUND OF THE INVENTION

This invention relates to devices with an electric motor for rotationally driving a multi-bladed fan.

Electric motor driven fans are well known in the art. Examples of such devices are illustrated in U.S. Pat. No. 2,472,039 issued May 31, 1949 and U.S. Pat. No. 2,628,771 issued Feb. 17, 1953, the disclosures of which are hereby incorporated by reference. FIG. 1 is a side perspective view illustrating such a device generally designated with reference numeral 10. As seen in this Fig., a multi-bladed fan 11 is mounted on a rotatable shaft 12 driven by an electric motor 14. Motor 14 is supported on a vertically extending pedestal 15, which is secured at the lower end to a base member 17. In some designs, provision is made for enabling motor 14 to rotate in a reciprocating manner on pedestal 15 in order to provide an oscillating motion for fan 11 to distribute the air over an area greater than that covered by a stationary fan.

One difficulty encountered with the device shown in FIG. 1 resides in the fact that the fan motor 14 can be relatively heavy. Since the motor 14 necessarily rests on the top of pedestal 15, the device tends to be top heavy and therefore potentially mechanically unstable. To offset this potential instability, the base member 17 must be relatively large and contain more mass than would ordinarily be required. This results in the device having a relatively larger mass and a much larger footprint, which adversely affects ease of handling and the number of potential locations at which the device may be placed for operational use.

SUMMARY OF THE INVENTION

The invention comprises a motor driven fan device which is devoid of the above-noted disadvantages, and which can be made more positionally stable and smaller in footprint size than known devices.

From an apparatus standpoint, the invention comprises an electric motor driven fan device including a base member having a plurality of external walls defining an enclosure, with one of the walls being a top wall; and an electrically powered motor mounted within the base member in the enclosure, the motor having an output shaft. The motor may be either an A.C. motor or a D.C. motor. The motor output shaft is coupled to the inner race of a first bearing having a rotatable inner race and a stationary outer race. The outer race is secured to the base member, preferably to the top wall. A flexible drive shaft assembly is provided which includes a flexible drive shaft having a first end and a second end, and a bendable sheath surrounding the flexible drive shaft, the bendable sheath having a first end and a second end. The flexible drive shaft preferably comprises a wire core having a preselected diameter surrounded by multiple oppositely helically wound layers of the wire.

The first end of the flexible drive shaft is coupled to the rotatable inner race of the first bearing so as to be rotated by the motor output shaft when the motor is activated by electrical power. The first end of the bendable sheath is secured via the stationary outer race of the first bearing to the base member, preferably to the top wall. The second end of the flexible drive shaft is secured to the rotatable inner race of a second bearing, and the second end of the bendable sheath is secured to the outer race of the second bearing. The inner race of the second bearing is also coupled to a driven shaft coupled to a multi-bladed fan.

When the motor is activated by electrical power, the motor output shaft drives the flexible drive shaft via the inner race of the first bearing. Rotation of the flexible drive shaft is transferred to the fan via the inner race of the second bearing and the driven shaft. The bendable sheath provides manual adjustability of and positional stability for the upper elements of the fan device comprising the second bearing, the driven shaft and the fan. Since the predominant mass of the fan device is comprised of the base member, motor, motor output shaft and first bearing 25, the device is positionally very stable, even when the motor is being operated and the fan is rotating.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
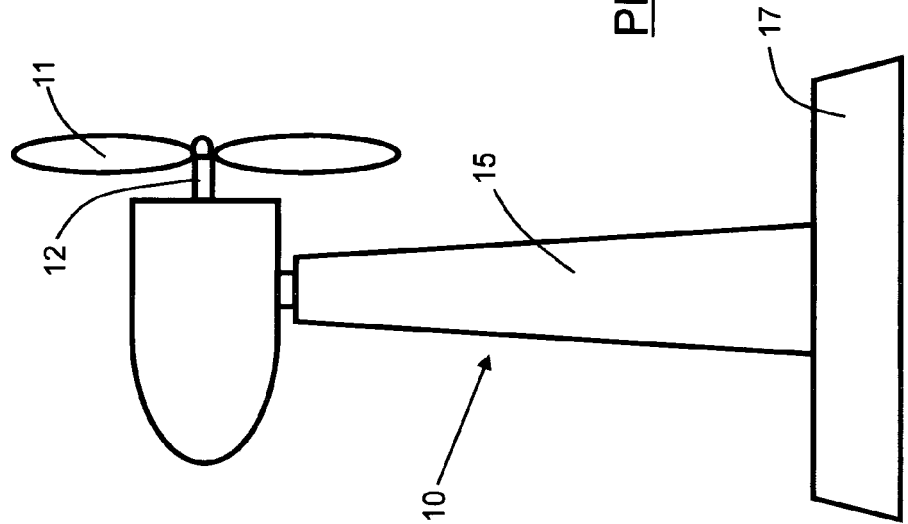
FIG. 1 is a FIG. 1 is a side perspective view of a prior art electric motor driven fan.
Figure 2:
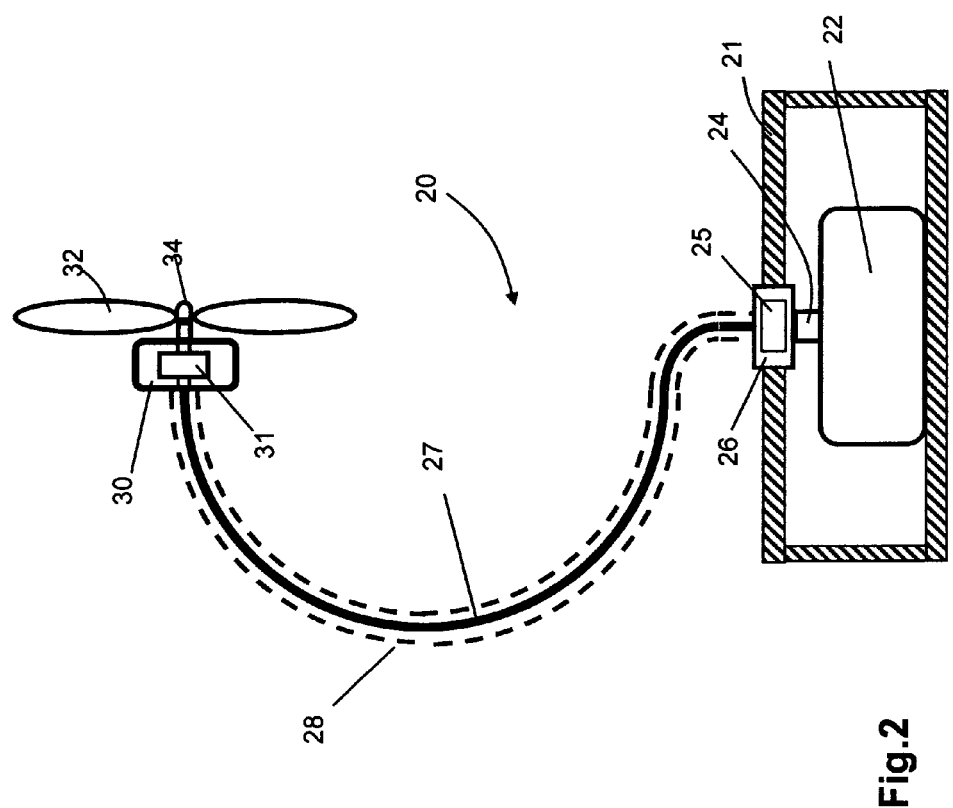
FIG. 2 is a schematic side perspective view partially in section of a preferred embodiment of an electric motor driven fan according to the invention.
Figure 3:
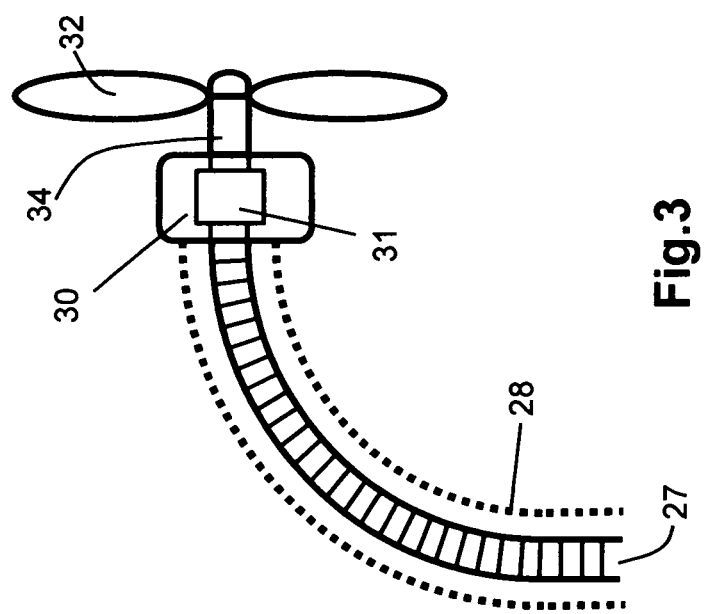
FIG. 3 is an enlarged side view partially in section illustrating the flexible drive shaft assembly of the preferred embodiment of FIG. 2.

Turning now to the drawings, FIGS. 2 and 3 illustrate the preferred embodiment of an electric motor driven fan according to the invention. As seen in these Figs., a fan device generally designated with reference numeral 20 includes a base member 21 having a plurality of wall portions defining a hollow interior enclosing an electric drive motor 22. Motor 22 may comprise a D.C. motor such as a type MM4056B motor available from Nippon Seimitsu Kogyo Corp. of Japan or an A.C. motor such as a type GE 5312 single phase A.C. motor available from General Electric Corp. of the United States of America. Each motor type is powered by a compatible source of electric power (not illustrated), such as batteries or an A.C.-to-D.C. converter for a D.C. motor and a source of A.C. power for an A.C. motor.

Motor 22 has an output shaft 24 coupled to a facing end of an inner race 25 of a first shaft bearing having an outer race 26 fixedly mounted in the upper wall of base member 21. Secured to the other end of the inner race 25 of the first shaft bearing is a flexible drive shaft 27 rotatably enclosed in a bendable sheath 28. One end of sheath 28 is secured via outer bearing race 26 to base member 21 in any suitable fashion.

Figure 4:
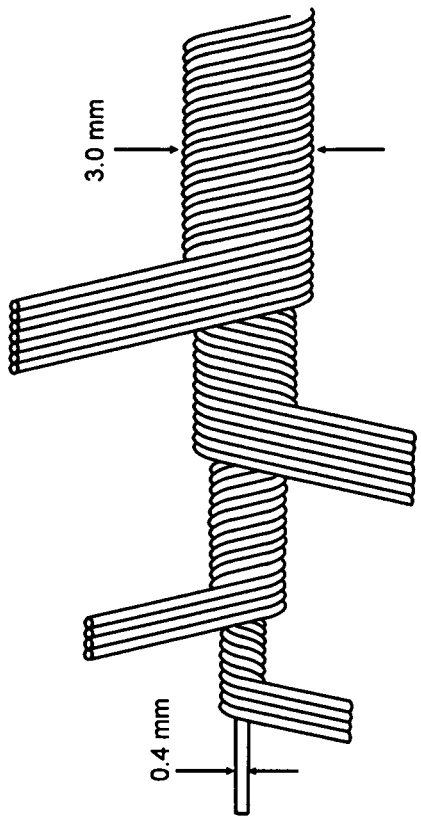
FIG. 4 is an enlarged partial plan view of a portion of the flexible drive shaft illustrating the construction of this element.

Flexible drive shaft 27 is illustrated in FIG. 4 and preferably comprises a spring steel core having a diameter of 0.29 mm. surrounded by multiple oppositely helically wound layers of the same wire, with the outermost layer having an outer diameter of 3.00 mm. as shown in FIG. 4. Shaft 27 may be fabricated from pre-wound flexible shaft material available from Ningbo Dingshun Electronic Technology Co. Ltd of China.

Sheath 28 is preferably fabricated from a commercially available material sold under the trade designation bend-and-stay hose or flexible gooseneck arm. One supplier of such material is McMaster-Carr hardware supply company of Robbinsville, N.J., United States of America. Sheath 28 has the property of being bendable about the central axis but retaining its shape when the bending force is removed. The material from which sheath 28 is fabricated is commonly found in table lamps known as gooseneck lamps. In the invention, sheath 28 functions to provide a protective enclosure for flexible drive shaft 27 and to provide adjustable yet stable positioning for the fan.

The upper end of flexible drive shaft 27 is coupled to the rotatable inner race 31 of a second bearing. The upper end of sheath 28 is secured to the stationary outer race 30 of the second bearing. A multi-bladed fan 32 is secured to a driven shaft 34, and the input end of driven shaft 34 is secured to the rotatable inner race 31 of the second bearing. Fan 32 is preferably a type K-FAN6011 available from General Electric Corp.

In use, when electric power is applied to motor 22, motor output shaft 24 rotates. This rotational motion is transferred to flexible shaft 27. The rotational motion of shaft 27 is transferred to driven fan shaft 34, which causes rotation of fan 32. The attitude of fan 32 with respect to a convenient spatial reference (such as a horizontal surface on which the device may be placed) can be readily adjusted by manually bending sheath 28 in any desired direction. After such re-positioning, the attitude of fan 32 is maintained by sheath 28.

Due to the fact that the predominant mass of the fan device is comprised of base member 21, motor 22, shaft 24 and bearing 25, the device is positionally very stable, even when the motor is being operated and fan 32 is rotating.

As will now be apparent, electric motor driven fan devices fabricated according to the teachings of the invention are relatively simple in construction, positionally stable and highly portable. In addition, the combination of flexible drive shaft 27 and bendable sheath affords great flexibility in positioning the direction of air flow from fan 32 to virtually any direction. Moreover, by arranging the predominant mass of the device at the lower end (i.e. base member 21, motor 22, et. al.), the size of the base member can be reduced over that of known fan devices so that the device can be accommodated in more compact locations.

Although the above provides a full and complete disclosure of the preferred embodiments of the invention, various modifications, alternate constructions and equivalents will occur to those skilled in the art. For example, while the invention has been described with reference to specific motor types, flexible shaft wire sizes, and sheath material and fan type, other specific elements may be employed, depending on the preferences of the device designer. Therefore, the above should not be construed as limiting the invention, which is defined by the appended claims.

What is claimed is:

1. An electric motor driven fan device comprising:
a base member having a plurality of external walls defining an enclosure;
an electrically powered motor mounted within said base member in said enclosure, said motor having an output shaft;
a first bearing having a rotatable inner race and a stationary outer race secured to said base member, said output shaft of said motor being secured to said inner race of said first bearing;
a flexible drive shaft assembly including a flexible drive shaft having a first end and a second end, and a bendable sheath surrounding said flexible drive shaft, said bendable sheath having a first end and a second end;
said first end of said flexible drive shaft being coupled to said rotatable inner race of said first bearing so as to be rotated by said motor output shaft when said motor is activated by electrical power;
said first end of said bendable sheath being secured to said base member via said outer race of said first bearing;
a multi-bladed fan;
a driven shaft coupled to said fan;
a second bearing having a rotatable inner race secured to said driven shaft, and an outer race;
said second end of said flexible drive shaft being secured to said rotatable inner race of said second bearing so that said fan is rotated when said motor is activated by electrical power;
said second end of said bendable sheath being secured to said outer race of said second bearing to prevent rotation thereof,
said bendable sheath providing position adjustable mechanical support for said fan, said driven shaft and said second bearing;
said base member, said motor and said first bearing providing mechanical stability for said fan device.

2. The invention of claim 1 wherein said motor is a D.C. motor.

3. The invention of claim 1 wherein said motor is an A.C. motor.

4. The invention of claim 1 wherein said flexible drive shaft comprises a wire core having a preselected diameter surrounded by multiple oppositely helically wound layers of the said wire.

5. The invention of claim 1 wherein one of said plurality of external walls of said base member comprises a top wall; and wherein said stationary outer race of said first bearing is secured to said top wall.

6. The invention of claim 1 wherein one of said plurality of external walls of said base member comprises a top wall; and wherein said first end of said bendable sheath is secured to said outer race of said first bearing, which outer race is connected with said top wall.

* * * * *